United States Patent
Conley (10) Patent No.: US 10,899,287 B1
(45) Date of Patent: Jan. 26, 2021

(54) WEIGHTED BED LINER

(71) Applicant: John E. Conley, Warren, OH (US)

(72) Inventor: John E. Conley, Warren, OH (US)

(73) Assignee: Traction Master LLC, Warren, OH (US)

( * ) Notice: Subject to any disclaimer, the term of this patent is extended or adjusted under 35 U.S.C. 154(b) by 0 days.

(21) Appl. No.: 16/575,958

(22) Filed: Sep. 19, 2019

(51) Int. Cl.
| | | |
|---|---|---|
| *B60R 13/01* | (2006.01) | |
| *B60P 3/06* | (2006.01) | |
| *B32B 5/18* | (2006.01) | |
| *B32B 27/06* | (2006.01) | |
| *B32B 27/40* | (2006.01) | |
| *B60B 39/00* | (2006.01) | |

(52) U.S. Cl.
CPC ............... *B60R 13/01* (2013.01); *B32B 5/18* (2013.01); *B32B 27/065* (2013.01); *B32B 27/40* (2013.01); *B32B 2266/0214* (2013.01); *B32B 2605/08* (2013.01); *B60B 39/00* (2013.01); *B60R 2013/016* (2013.01)

(58) Field of Classification Search
CPC ..... B60R 13/01; B60R 2013/016; B32B 5/18; B32B 27/065; B32B 27/40; B32B 2605/08; B32B 2266/0214; B60B 39/00

USPC ........................................................ 296/39.1
See application file for complete search history.

(56) References Cited

U.S. PATENT DOCUMENTS

| | | | |
|---|---|---|---|
| 4,796,914 A | 1/1989 | Raynor | |
| 5,172,953 A | 12/1992 | Chamberlain | |
| 5,494,315 A | 2/1996 | Heltenburg | |
| 6,129,409 A * | 10/2000 | D'Amico | ................ B60R 13/01 296/184 |
| 6,478,356 B1 | 11/2002 | Wayne | |
| 8,011,692 B2 | 9/2011 | Friesen | |
| 2011/0181067 A1* | 7/2011 | Dunn et al. | ............. B60R 13/01 296/39.2 |
| 2014/0265412 A1 | 9/2014 | Ellis et al. | |

\* cited by examiner

*Primary Examiner* — Joseph D. Pape
*Assistant Examiner* — Dana D Ivey
(74) *Attorney, Agent, or Firm* — Renner Kenner Law Firm & Weber (57) ABSTRACT

A vehicle bed liner for providing additional weight to a vehicle includes a support layer including a base material having a thickness, where the thickness of the base material is substantially constant across the entirety of the base material, a weight-receiving compartment within the support layer, and a weight-storing article within the weight-receiving compartment adapted to receive a plurality of weight-providing articles, wherein the plurality of weight-providing articles are capable of being positioned in the weight-storing article to thereby provide additional weight to a vehicle.

16 Claims, 10 Drawing Sheets

WEIGHTED BED LINER

FIELD OF THE INVENTION

The present invention relates to a vehicle bed liner apparatus for providing additional weight to a vehicle, particularly for providing the additional weight over a rear axle of the vehicle.

BACKGROUND OF THE INVENTION

Certain vehicles, such as certain pickup trucks and vans, may be designed on the basis that those vehicles will regularly carry cargo. This design is problematic when these vehicles are empty of the cargo. An empty cargo scenario leads to insufficient weight over the rear axle, which is problematic because the vehicles were designed to include this weight in order to achieve balanced handling. This insufficient weight over the rear axle eventually may lead to insufficient traction from the rear wheels in slippery conditions, such as when driving on ice, snow, water, mud, or sand.

Thus, apparatuses and techniques have been proposed for adding weight to these vehicles when these vehicles do not include sufficient cargo. For example, many users will add sandbags or similar bagged articles, such as gravel and rock salt, to the vehicle. However, these weighted articles can move during vehicle travel and can also interfere with the ability to store things in the vehicle.

U.S. Pat. No. 4,796,914 discloses a protective liner including a hollow compartment formed in a bottom wall of the protective liner for use as a ballast chamber therein. A filling opening and a drainage opening are provided for adding and removing liquid ballast to and from the ballast chamber. However, the ballast chamber of the '914 Patent at least does not particularly direct the weight of the liquid ballast in a position directly above the rear axle.

U.S. Pat. No. 5,494,315 discloses a truck bed ballast apparatus including a container assembly for receiving a quantity of sand. In some embodiments, a bracing element is connected between a first container assembly and a second container assembly. However, the container assembly of the '315 Patent at least does not allow for easy removal of the quantity of sand, and requires connectors, such as bolts or screws, to connect to the bed. And, the bracing element of the '315 Patent interferes with the ability to store things in the vehicle.

U.S. Pat. No. 8,011,692 discloses a system to provide ballast weight and to secure accessories on a vehicle load bed including a plurality of hollow planks placed on the load bed adjacent to each other. At least one plank includes a filling orifice with a removable cap to allow filling with ballast. However, the system of the '692 Patent at least requires a clip fastened to the load bed by a nut and does not allow for easy removal of the ballast.

U.S. Publication No. 2014/0265412 discloses a bedliner ballast system including a hollow bedliner for a vehicle bed capable of holding a liquid ballast material, such as water, which can be added to or drained from the bedliner. The bedliner is constructed with longitudinal interior baffles. However, the hollow bedliner of the '412 Publication at least does not particularly direct the weight of the liquid ballast in a position directly above the rear axle.

SUMMARY OF THE INVENTION

In a first embodiment, the present invention provides a vehicle bed liner including a support layer including a base material having a thickness, wherein the thickness of the base material is substantially constant across the entirety of the base material, a weight-receiving compartment within the support layer, and a weight-storing article within the weight-receiving compartment adapted to receive a plurality of weight-providing articles, wherein the plurality of weight-providing articles are capable of being positioned in the weight-storing article to thereby provide additional weight to a vehicle.

In a second embodiment, the present invention provides a vehicle bed liner as in any of the above embodiments, wherein the weight-storing article is a grid including a plurality of first cross members each transversely intersecting with a plurality of second cross members to thereby define a plurality of weight-receiving trays adapted to receive the plurality of weight-providing articles.

In a third embodiment, the present invention provides a vehicle bed liner as in any of the above embodiments, wherein the thickness of the base material is from about 1 inch to about 3 inches.

In a fourth embodiment, the present invention provides a vehicle bed liner as in any of the above embodiments, wherein the weight-receiving compartment is a hollow, rectangular portion of the support layer.

In a fifth embodiment, the present invention provides a vehicle bed liner as in any of the above embodiments, wherein the plurality of first cross members are longitudinally extending members, and wherein the plurality of second cross members are laterally extending members.

In a sixth embodiment, the present invention provides a vehicle bed liner as in any of the above embodiments, wherein the plurality of weight-providing articles are weight-receiving articles adapted to be filled with a weight-providing material.

In a seventh embodiment, the present invention provides a vehicle bed liner as in any of the above embodiments, wherein the plurality of weight-providing articles are unitary weighted articles not requiring further filling with a weight-providing material.

In an eighth embodiment, the present invention provides a vehicle bed liner as in any of the above embodiments, wherein a bottom layer is positioned between the support layer and a vehicle bed to thereby provide protection of the vehicle bed.

In a ninth embodiment, the present invention provides a vehicle bed liner as in any of the above embodiments, wherein the support layer is adhesively secured with the bottom layer by a plurality of hook-and-loop fasteners or a plurality of snap fasteners.

In a tenth embodiment, the present invention provides a vehicle bed liner as in any of the above embodiments, wherein a top layer is positioned above the support layer to thereby provide protection of the support layer, the top layer including a removable portion in a position above the weight-receiving compartment.

In an eleventh embodiment, the present invention provides a vehicle bed liner as in any of the above embodiments, wherein the support layer is adhesively secured with the top layer by a plurality of hook-and-loop fasteners or a plurality of snap fasteners.

In a twelfth embodiment, the present invention provides a vehicle bed liner as in any of the above embodiments, further comprising a top base layer and a bottom base layer surrounding the base material.

In a thirteenth embodiment, the present invention provides a vehicle bed liner as in any of the above embodiments, wherein the base material is polyisocyanurate foam.

In a fourteenth embodiment, the present invention provides a vehicle bed liner as in any of the above embodiments, wherein the top base layer and the bottom base layer are made from a thermoplastic polyurethane.

In a fifteenth embodiment, the present invention provides a vehicle bed liner as in any of the above embodiments, wherein the weight-receiving compartment is rectangular and has a length of from about 3 feet to about 6 feet and a width of from about 2 feet to about 4 feet.

In a sixteenth embodiment, the present invention provides a vehicle bed liner as in any of the above embodiments, wherein each of the plurality of weight-providing articles weighs from about 5 pounds to about 15 pounds.

In a seventeenth embodiment, the present invention provides a vehicle bed liner as in any of the above embodiments, wherein all of the plurality of weight-providing articles have a combined weight of from about 250 pounds to about 350 pounds.

In an eighteenth embodiment, the present invention provides a vehicle bed liner including a support layer including a base material having a thickness of from about 1 inch to about 3 inches, wherein the thickness of the base material is substantially constant across the entirety of the base material, a weight-receiving compartment within the support layer, a weight-storing article positionable within the weight-receiving compartment, and a plurality of weight-receiving articles adapted to be filled with a weight-providing material and adapted to be positioned in the weight-storing article to thereby provide additional weight to a vehicle.

In a nineteenth embodiment, the present invention provides a vehicle bed liner kit as in any of the above embodiments, wherein the weight-receiving compartment is a hollow, rectangular portion of the support layer, wherein the weight-storing article is a grid including a plurality of longitudinally extending members each transversely intersecting with a plurality of laterally extending members to thereby define a plurality of weight-receiving trays adapted to receive the plurality of weight-providing articles.

In a twentieth embodiment, the present invention provides a vehicle bed liner kit as in any of the above embodiments, further comprising a bottom layer made of rubberized fabric and a top layer made of plastic, wherein the bottom layer and the top layer are adhesively securable with the support layer, the support layer further comprising a top base layer and a bottom base layer surrounding the base material, wherein the base layer is made of polyisocyanurate foam, the top layer further comprising a removable portion in a position above the weight-receiving compartment.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

One or more embodiments of the present invention provide a weighted bed liner, which may be particularly useful for providing additional weight to a vehicle. Advantageously, the weighted bed liner provides the additional weight in a position sufficiently over the rear axle in order to achieve better handling of the vehicle, which may be particularly helpful for slippery driving conditions, such as when driving on ice, snow, water, mud, or sand. The weighted bed liner also allows the additional weight to be easily removed when the additional weight is not desired by the vehicle user. The weighted bed liner also may provide a top surface that is parallel or substantially parallel with a bed or floor of a vehicle, and may cover all or substantially all of the bed or floor of the vehicle, in order to provide a better storage surface and to prevent certain injuries.

With reference to the Figures, a weighted bed liner according to one or more embodiments of the present invention is generally indicated by the numeral 10. Weighted bed liner 10, which may also be referred to as ballasted bed liner 10, includes a support layer 12 positioned on a vehicle bed 14. Vehicle bed 14 may be part of any suitable vehicle, such as a pick-up truck or cargo van. Support layer 12 is of a sufficient thickness for inclusion of a weight-receiving compartment 16 therein, which is adapted to receive a plurality of weight-providing articles 18. Weight-receiving compartment 16 may include a weight-storing article 20 particularly adapted to receive the plurality of weight-providing articles 18. A bottom layer 22 may be provided between support layer 12 and vehicle bed 14 for protection of vehicle bed 14 and for adhesive securement of support layer 12. A bottom layer 22 may be provided between support layer 12 and vehicle bed 14 for protection of vehicle bed 14 and for adhesive securement of support layer 12. A top layer 24 may be provided above support layer 12 for further protection of support layer 12 and further securement of weight-providing articles 18.

As suggested above, support layer 12, which may also be referred to as outer support 12, should be of sufficient thickness for inclusion of weight-receiving compartment 16. This thickness of support layer 12, which may also be described as vertical off-set from vehicle bed 14, also should provide support layer 12 with sufficient strength such that cargo may be loaded on top of, and without damaging, weighted bed liner 10.

Support layer 12 may take any suitable shape, which may be based on a desired vehicle (e.g. pick-up truck, cargo van) where weighted bed liner 10 will be utilized.

In one or more embodiments, as shown in FIGS. 1-3 and FIG. 6, support layer 12 may be rectangular shaped, which may be desirable from a manufacturing standpoint. In these embodiments, the length and width may be based on the largest rectangular shape that will fit within the bed length and the width between the wheel wells of vehicle bed 14.

In other embodiments, as shown in FIGS. 7-10, support layer 12 may be shaped to fit with the internal perimeter of vehicle bed 14, which may be desirable for providing a fully even surface with vehicle bed 14. In one or more of these embodiments, support layer 12 may be manufactured as a unitary shape. In other embodiments, the portions of support layer 12 that are in addition to the rectangular shape (i.e. the portions in front of and behind the wheel wells) may be manufactured separately from the rectangular shape and then assembled with the rectangular shape, such as by an adhesive.

In one or more embodiments, support layer 12 may have a length of from about 5 feet to about 9 feet, in other embodiments, from about 6 feet to about 8 feet, in other embodiments, from about 5 feet to about 7 feet, and in other embodiments, from about 7 feet to about 9 feet. In one or more embodiments, support layer 12 may have a width of from about 3 feet to about 6 feet, in other embodiments, from about 3 feet to about 5 feet, in other embodiments, from about 3 feet to about 4 feet, in other embodiments, from about 4 feet to about 5 feet, and in other embodiments, about 50 inches.

Support layer 12 may be made from a variety of layers. In one or more embodiments, support layer 12 may be made from a base layer 26 that is surrounded by a bottom layer and a top layer 28.

Base layer 26 generally provides the sufficient thickness and strength to support layer 12 and may be made from any suitable material providing the sufficient thickness and strength. In one or more embodiments, base layer 26 may be made from a thermoset plastic such as polyisocyanurate foam of the type generally otherwise used as rigid thermal insulation. Other exemplary materials for base layer 26 include foam rubbers, expanded polystyrene, hard plastics, elastomers, and thermoplastic elastomers.

In one or more embodiments, base layer 26 may be manufactured as a unitary shape. In other embodiments, the portions of base layer 26 that are in addition to the rectangular shape (i.e. the portions in front of and behind the wheel wells) may be manufactured separately from the rectangular shape and then assembled with the rectangular shape, such as by an adhesive.

In one or more embodiments, base layer 26 may have a thickness of from about 0.5 inches to about 4 inches, in other embodiments, from about 1 inch to about 3 inches, in other embodiments from about 1.5 inches to about 2.5 inches. In one or more embodiments, base layer 26 may have a thickness of about 2 inches. For purposes of this specification, any range or endpoint disclosed herein with the term "about" refers to those ranges or endpoints consistent with concepts of the present invention and may also describe the particular range or endpoint. Inasmuch as base layer 26 forms the main thickness of weighted bed liner 10, in one or more embodiments, the thicknesses described in this paragraph may also refer to the overall thickness of weighted bed liner 10. In one or more embodiments, the thickness of base layer 26 is of a constant or substantially constant thickness across the entirety of base layer 26, except for the hollow portion of weight-receiving compartment 16, in order to provide a flat surface, such as for safe walking and standing, and for adding cargo thereon where desired.

In one or more embodiments, base layer 26 may have a compressive strength of from about 10 pounds per square inch (psi) to about 100 psi, in other embodiments, from about 20 psi to about 50 psi, and in other embodiments from about 25 psi to about 40 psi. In one or more embodiments, base layer 26 may have a compressive strength of at least 15 psi, in other embodiments, at least 25 psi, and in other embodiments, at least 40 psi. The compressive strength may be measured in accord with ASTM D1621.

Base layer 26 may be surrounded by base bottom layer (not seen) and base top layer 28, such as for sealing or providing other protection to base layer 26. Base bottom layer and base top layer 28 may be made from any suitable material for providing sufficient sealing or protection to base layer 26. In one or more embodiments, base bottom layer and base top layer 28 may be thin films. In one or more embodiments, base bottom layer and base top layer 28 may be made from a thermoplastic polyurethane of the type generally otherwise used as protective film. In one or more embodiments, base bottom layer and base top layer 28 may made from extruded polyurethane film. Other exemplary materials for base bottom layer and base top layer 28 include other plastics and elastomers (e.g. silicone rubber) that can be formed into thin, protective films. Another exemplary material for base bottom layer and base top layer 28 is a sprayable material of the type of the type generally otherwise used as a spray-in bedliner for a vehicle.

Figure 1:
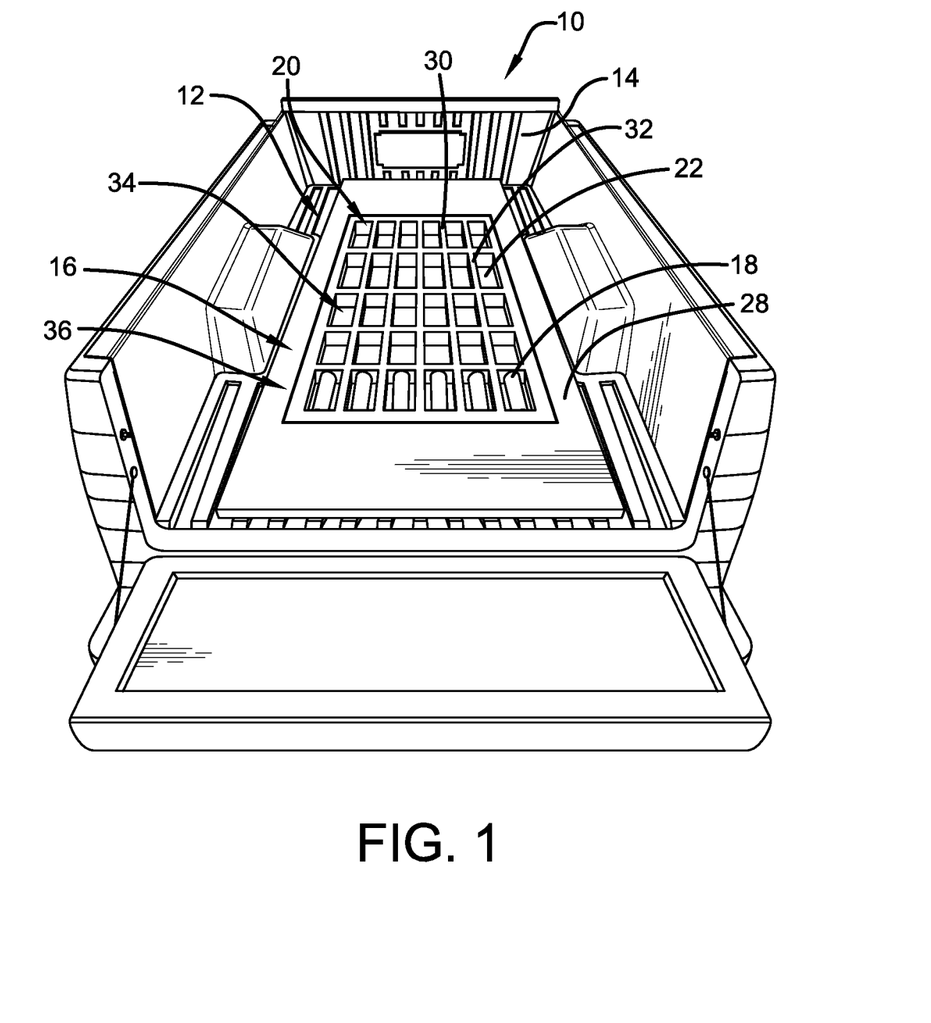
FIG. 1 is a perspective view of a weighted bed liner according to one or more embodiments of the present invention, shown in a truck bed, and shown with a rectangular outer perimeter, and shown with weight-providing articles in a grid in a weight-receiving compartment of a support layer, and shown without a top cover layer.
Figure 2:
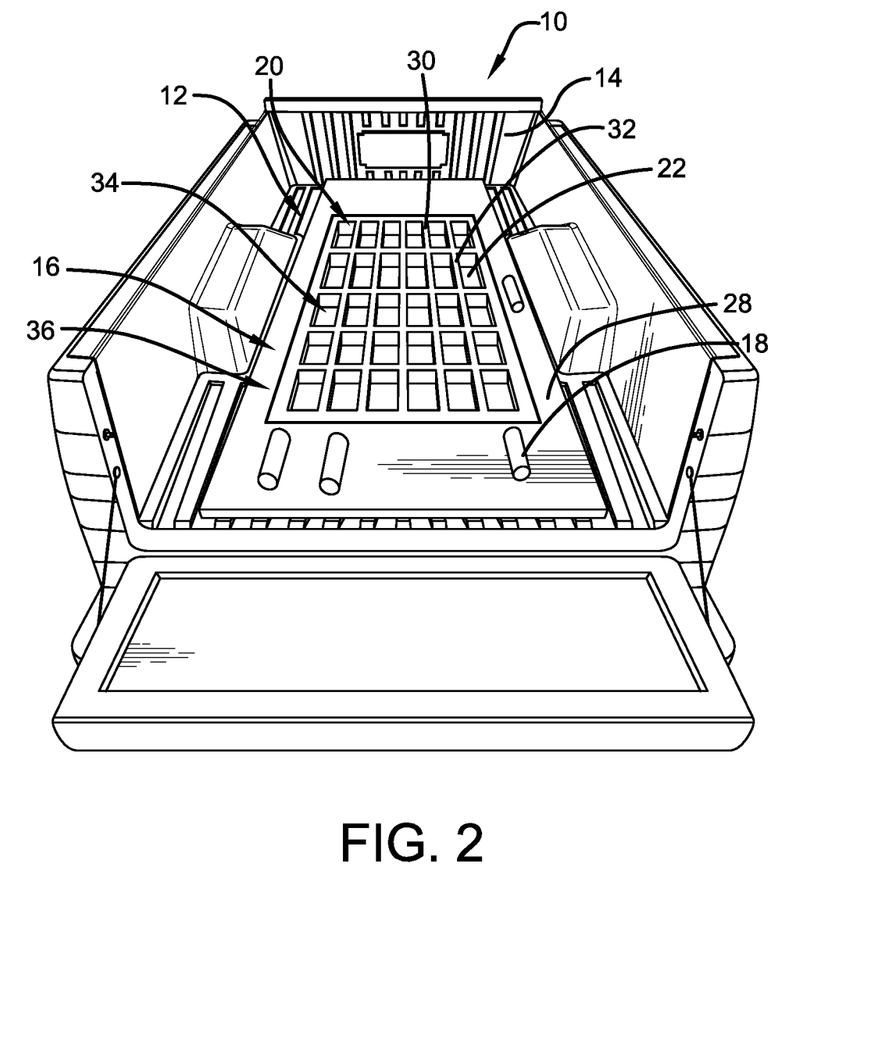
FIG. 2 is a perspective view of the weighted bed liner shown in FIG. 1, shown with empty weight-receiving articles.
Figure 3:
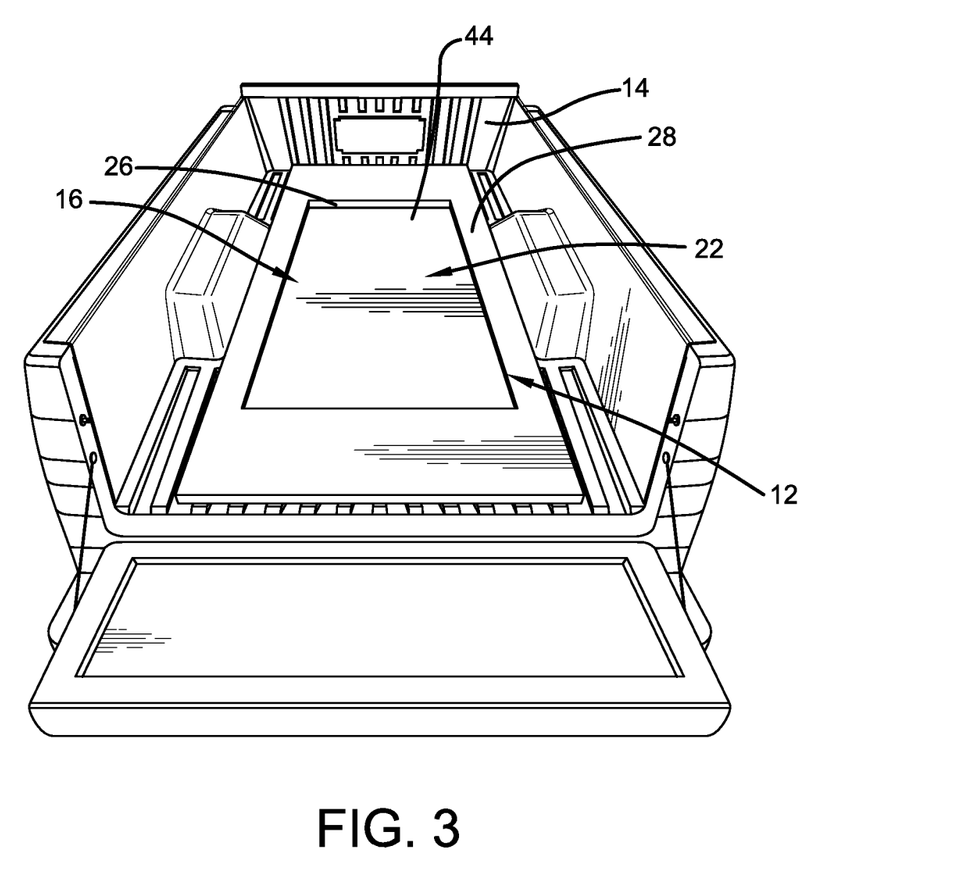
FIG. 3 is a perspective view of the outer support, having the weight-receiving compartment therein, of the weighted bed liner shown in FIG. 1.
Figure 4:
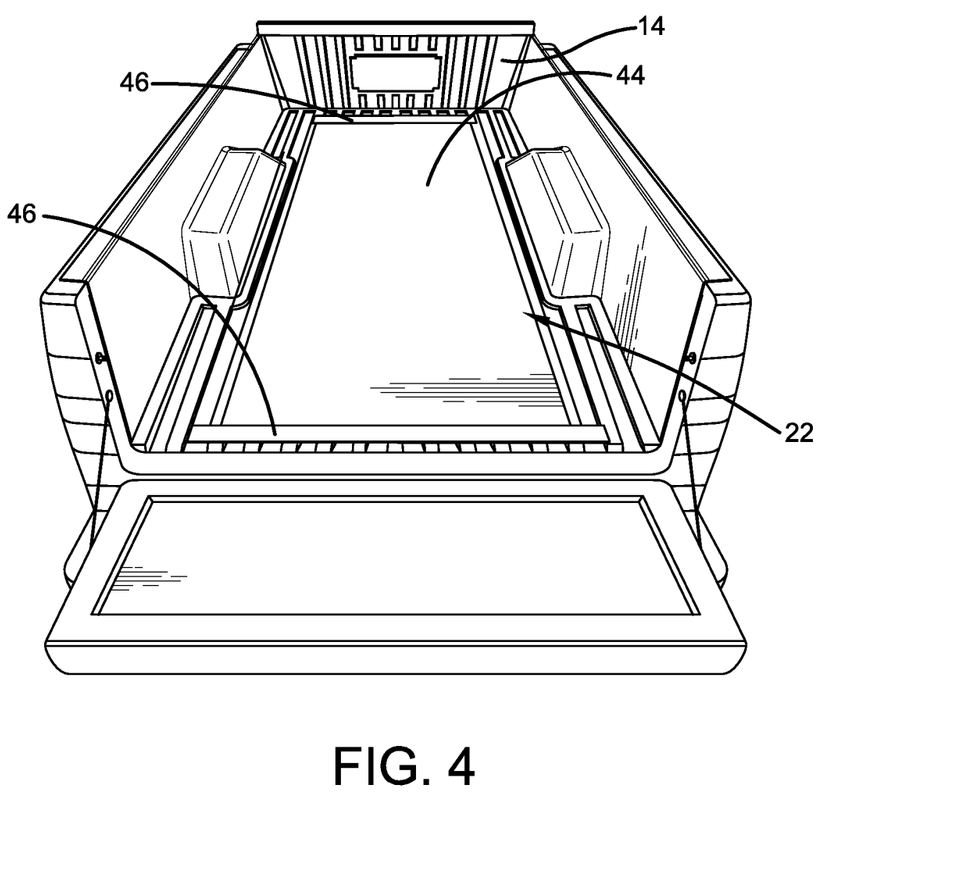
FIG. 4 is a perspective view of a bottom layer of the weighted bed liner shown in FIG. 1.

The bottom surface of base layer 26, or base bottom layer where present, may include an adhesive for securing this bottom surface to vehicle bed 14. This may include securing this bottom surface to bottom layer 22 where bottom layer 22 is secured to vehicle bed 14. This adhesive may be removable, such that the respective portions can be separated as desired. Exemplary adhesives include touch fasteners, such as hook-and-loop fasteners. Other adhesives, such as removable pressure sensitive adhesives, may also be suitable. In one or more embodiments, the adhesive is positioned along each end of this bottom surface, generally corresponding to the positions of the adhesives as shown in FIG. 4, which will be further described herein with respect to bottom layer 22. In one or more embodiments, the adhesive may be in strips of from about 1 foot to about 2 feet long and from about 1 inch to about 2 inches.

The top surface of base layer 26, or base top layer 28 where present, may include an adhesive for securing this top surface to top layer 24. This adhesive may be removable, such that the respective portions can be separated as desired. Exemplary adhesives include touch fasteners, such as hook-and-loop fasteners. Other adhesives, such as removable pressure sensitive adhesives, may also be suitable. In one or more embodiments, the adhesive is positioned along each end of this top surface (not shown, but generally corresponding to the positions of the adhesives as shown in FIG. 4 for bottom layer 22). In one or more embodiments, the adhesive may be in strips of from about 1 foot to about 2 feet long and from about 1 inch to about 2 inches.

As discussed above, weight-receiving compartment 16 is formed as a hollow portion of support layer 12. Weight-receiving compartment 16 extends all the way through support layer 12 and therefore may be described as a hollow portion of support layer 12.

Weight-receiving compartment 16 may be generally centrally located within support layer 12. The position of weight-receiving compartment 16 within support layer 12 may be such that weight-receiving compartment 16 is adapted for particular positioning above a rear-axle of a vehicle.

Weight-receiving compartment 16 may take any suitable shape, which may be based on a desired vehicle. In one or more embodiments, a rectangular shape for weight-receiving compartment 16 may be desirable. Base layer 26 may surround the entire perimeter of weight-receiving compartment 16.

In one or more embodiments, weight-receiving compartment 16 may have a length of from about 2 feet to about 6 feet, in other embodiments, from about 3 feet to about 6 feet, in other embodiments, from about 4 feet to about 5 feet. In one or more embodiments, weight-receiving compartment 16 may have a length of about 4.5 feet. In one or more embodiments, weight-receiving compartment 16 may have a width of from about 1.5 feet to about 5 feet, in other embodiments, from about 2 feet to about 4 feet, in other embodiments, from about 2.5 feet to about 3 feet. In one or more embodiments, weight-receiving compartment 16 may have a width of about 33 inches. Inasmuch as weight-storing article 20 is adapted to fit snugly within weight-receiving compartment 16, these described dimensions for weight-receiving compartment 16 also relate to weight-storing article 20.

Weight-storing article 20, which may also be described as storage article 20, may be any suitable apparatus that fits within weight-receiving compartment 16 and is capable of receiving weight-providing articles 18. In one or more embodiments, weight-storing article 20 may be a grid, as shown in the Figures. Weight-storing article 20 may be made from any suitable material, such as strong plastic (e.g. hard fiber reinforced plastic) and metal (e.g. steel). Weight-storing article 20 is of sufficient strength as to support cargo above weight-storing article 20.

Where weight-storing article 20 is a grid, grid 20 includes a plurality of first cross members 30, which may be described as longitudinal members 30, and a plurality of second cross members 32, which may be described as latitudinal members 32. Longitudinal members 30 intersect with latitudinal members 32 to define a plurality of weight-receiving trays 34 as hollow portions within grid 20. In one or more embodiments, this intersection between longitudinal members 30 and latitudinal members 32 may be a transverse intersection.

Weight-storing article 20 may include an adhesive on a bottom surface thereof for securing weight-storing article 20 to vehicle bed 14, which may include securing this bottom surface to bottom layer 22 where bottom layer 22 is secured to vehicle bed 14. This adhesive may be removable, and exemplary adhesives include touch fasteners, such as hook-and-loop fasteners. Other adhesives, such as removable pressure sensitive adhesives, may also be suitable.

Weight-receiving trays 34 within weight-storing article 20 are adapted to receive weight-providing articles 18 therein. In one or more embodiments, the plurality of weight-receiving trays 34 may be sized similar to weight-providing articles 18. In one or more embodiments, the plurality of weight-receiving trays 34 may be rectangular shaped. In one or more embodiments, the plurality of weight-receiving trays 34 may each be of identical or substantially identical shape.

In one or more embodiments, weight-receiving trays 34 may have a length of from about 4 inches to about 14 inches, in other embodiments, from about 6 inches to about 12 inches, in other embodiments, from about 8 inches to about 10 inches, and in other embodiments, about 9 inches. In one or more embodiments, weight-receiving trays 34 may have a width of from about 2 inches to about 8 inches, in other embodiments, from about 3 inches to about 7 inches, in other embodiments, from about 4 inches to about 6 inches, and in other embodiments, about 5 inches.

Outer longitudinal members 30 and outer latitudinal members 32 may be said to form a frame 36. Frame 36 may be of a shape corresponding with the perimeter of weight-receiving compartment 16.

In one or more embodiments, grid 20 may be formed as a unitary article, such as by plastic molding. In one or more embodiments, grid 20 may be assembled from components.

In one or more embodiments, with grid 20 in place, the thickness of weighted bed liner 10 is of a constant or substantially constant thickness across the entirety of weighted bed liner 10, except for any hollow portions of weight-receiving trays 34 that are not filled with weight-providing articles 18, in order to provide a flat surface, such as for safe walking and standing, and for adding cargo thereon where desired.

As discussed above, weight-providing articles 18 are adapted to provide additional weight to weighted bed liner 10 in order to provide that additional weight to a vehicle for improved control.

In one or more embodiments, each of the weight-providing articles 18 may provide a weight of from about 2 pounds to about 25 pounds, in other embodiments, from about 5 pounds to about 20 pounds, in other embodiments from about 8 pounds to about 15 pounds. In one or more embodiments, each of the weight-providing articles 18 may provide a weight of about 10 pounds, in other embodiments, about 12 pounds, and in other embodiments, about 15 pounds.

In one or more embodiments, all of the plurality of weight-providing articles 18 may have a combined weight of from about 150 pounds to about 500 pounds, in other embodiments, from about 250 pounds to about 450 pounds, in other embodiments from about 300 pounds to about 400 pounds. In one or more embodiments, all of the plurality of weight-providing articles 18 may have a combined weight of about 300 pounds, in other embodiments, about 350 pounds, and in other embodiments, about 400 pounds.

In one or more embodiments, weight-providing articles 18 may have a thickness of from about 0.5 inches to about 4 inches, in other embodiments, from about 1 inch to about 3 inches, in other embodiments from about 1.5 inches to about 2.5 inches. In one or more embodiments, weight-providing articles 18 may have a thickness of about 2 inches.

In one or more embodiments, weight-providing articles 18 may be weight-receiving articles. Weight-receiving articles are generally those articles that would be provided to a vehicle user in an empty condition, and then the vehicle user would add weight or ballast to the empty weight-receiving articles. In one or more embodiments, a kit of weighted bed liner 10 includes empty weight-receiving articles that are then filled with weighted material.

Where weight-providing articles 18 are weight-receiving articles, weight-receiving articles may be any articles capable of receiving a weighted material. Weight-receiving articles should be sealable in some manner as to retain the weighted material. Exemplary weight-receiving articles include bags and lidded bottles. An exemplary bag for weight-receiving articles is a canvas bag having a fold over flap that can be sealed with a hook-and-loop fastener. Exemplary weighted material includes sand, stones, metal shavings, water, gel, and combinations thereof. In one or more embodiments, the weighted material is sand wetted with water.

In one or more embodiments, weight-providing articles 18 may be unitary articles, which are generally defined as those articles not requiring a vehicle user to add additional weight. In one or more embodiments, a kit for weighted bed liner 10 includes unitary articles.

Where weight-providing articles 18 are unitary articles, weight-receiving articles may be any articles capable of providing weight to weighted bed liner 10. Exemplary unitary articles include large stones and concrete pieces.

As discussed above, bottom layer 22 may be provided between support layer 12 and vehicle bed 14 for protection of vehicle bed 14 and for adhesive securement of support layer 12. The shape of bottom layer 22 will generally correspond with the shape of support layer 12, and therefore the above-disclosed suitable shapes for support layer 12 are also incorporated here with respect to bottom layer 22.

Figure 5:
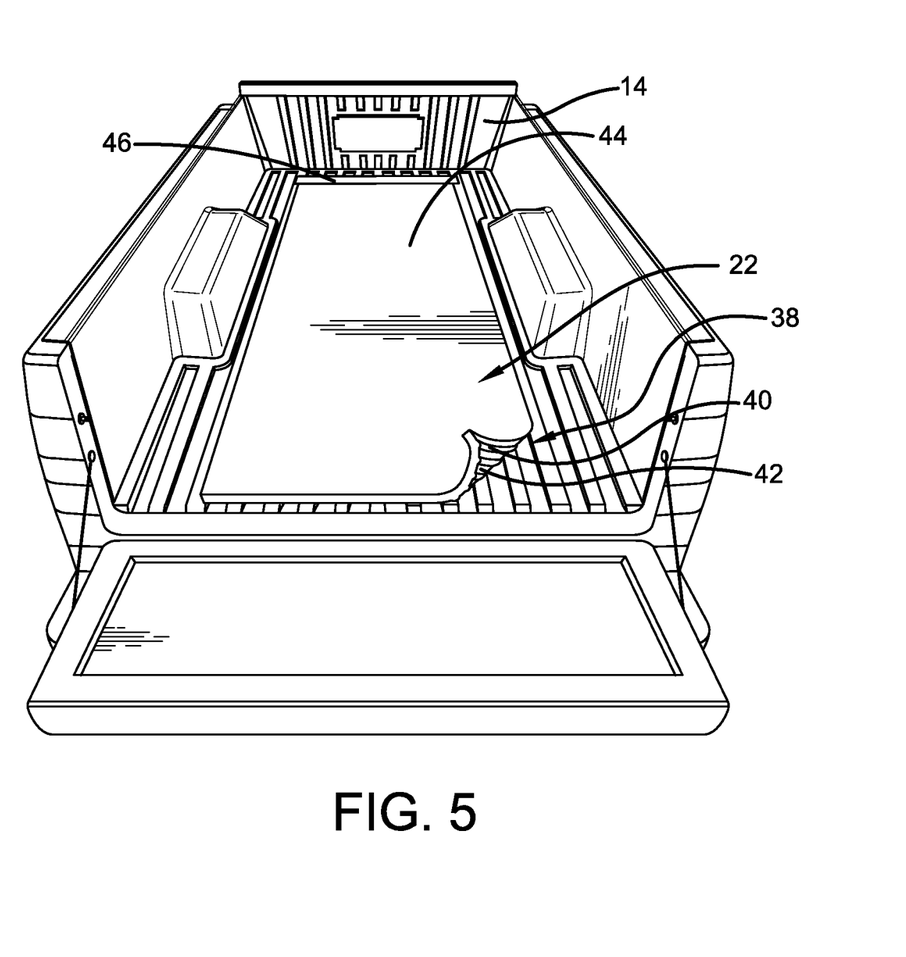
FIG. 5 is a perspective view showing a bottom surface of the bottom layer shown in FIG. 4.

Bottom layer 22 includes a bottom surface 38 that may be generally suitable for protecting vehicle bed 14. Bottom surface 38 may also be generally suitable for providing a gripping capability with vehicle bed 14 for better securement of the position of weighted bed liner 10. An exemplary bottom surface 38 is shown in FIG. 5. Bottom surface 38 includes a plurality of ridges 40 having a channel 42 between each corresponding pair of ridges 40. This configuration may be particularly suitable for providing a gripping capability with vehicle bed 14. Bottom surface 38 may be any suitable material, such as fabric or rubberized fabric. Where bottom layer 22 is not present, the bottom surface of support layer 12 may be provided with a surface configuration similar to bottom surface 38 described here.

Bottom layer 22 includes a top surface 44 that may be generally suitable for adhesive securement of support layer 12. Top surface 44 may also be suitable for providing a company logo and/or sales and reorder information. Where present, the company logo and/or sales and reorder information may be provided in the position generally corresponding with weight-receiving compartment 16 so that it may be seen even when support layer 12 is in place. Where present, the company logo and/or sales and reorder information may be provided as a decal or as painted information. Top surface 44 may be any suitable material, such as fabric or rubberized fabric. In one or more embodiments, top surface 44 and bottom surface 38 may be made from the same material.

As suggested above, top surface 44 may include adhesive portions 46 for securing bottom layer with support layer 12. Adhesive portions 46 may be removable, such that the respective portions can be separated as desired. Exemplary adhesive portions 46 include touch fasteners, such as hook-and-loop fasteners. Other adhesives, such as removable pressure sensitive adhesives and snap fasteners, may also be suitable. In one or more embodiments, adhesive portions 46 are positioned along each end of top surface 44, as shown in FIG. 4. In one or more embodiments, adhesive portions 46 may be in strips of from about 1 foot to about 2 feet long and from about 1 inch to about 2 inches. As suggested above, top surface 44 may also include adhesive portions (not shown) corresponding with the position of weight-storing article 20.

In one or more embodiments, adhesive portions 46 may overlap bottom layer 22 such that adhesive portions 46 serve to secure bottom layer 22 to vehicle bed 14. In one or more embodiments, the bottom surface 38 of bottom layer 22 may include additional adhesive portions for securing bottom layer 22 to vehicle bed 14. In one or more embodiments, the bottom surface 38 of bottom layer 22 may include a sealant material for better sealing of bottom layer 22 with vehicle bed 14. Any adhesive used with bottom layer 22 should be removable with minimal or no damage to vehicle bed 14.

As discussed above, top layer 24 may be provided above support layer 12 for further protection of support layer 12 and further securement of weight-providing articles 18. The shape of top layer 24 will generally correspond with the shape of support layer 12, and therefore the above-disclosed suitable shapes for support layer 12 are also incorporated here with respect to top layer 24. Top layer 24 should have sufficient strength such that cargo may be stored thereon or a user may stand thereon. Top layer 24 may therefore be made of a rigid material. An exemplary material for top layer 24 is plastic, such as hard plastics. Another exemplary material for top layer 24 is fiberglass. A top surface of top layer 24 may include an additional layer as may be desirable for custom flooring of the associated vehicle. Exemplary materials for such additional layer include polyurethane and wood.

As suggested above, a bottom surface of top layer 24 may include adhesive portions for securing top layer 24 with support layer 12. These adhesive portions may be removable, such that top layer 24 can be separated as desired. Exemplary adhesive portions include touch fasteners, such as hook-and-loop fasteners. Other adhesives, such as removable pressure sensitive adhesives and snap fasteners, may also be suitable. In one or more embodiments, adhesive portions are positioned along each end of the bottom surface of top layer 24. In one or more embodiments, adhesive portions may be in strips of from about 1 foot to about 2 feet long and from about 1 inch to about 2 inches.

Figure 6:
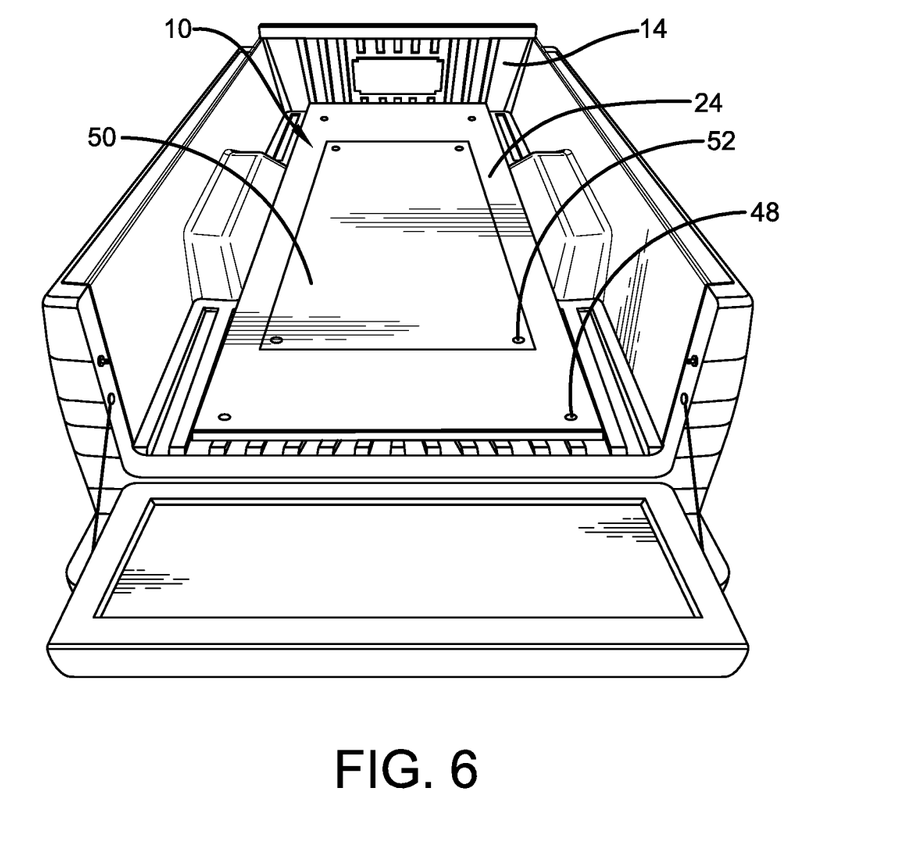
FIG. 6 is a perspective view of the weighted bed liner shown in FIG. 1, shown with the top cover layer, with a removable section thereof.
Figure 7:
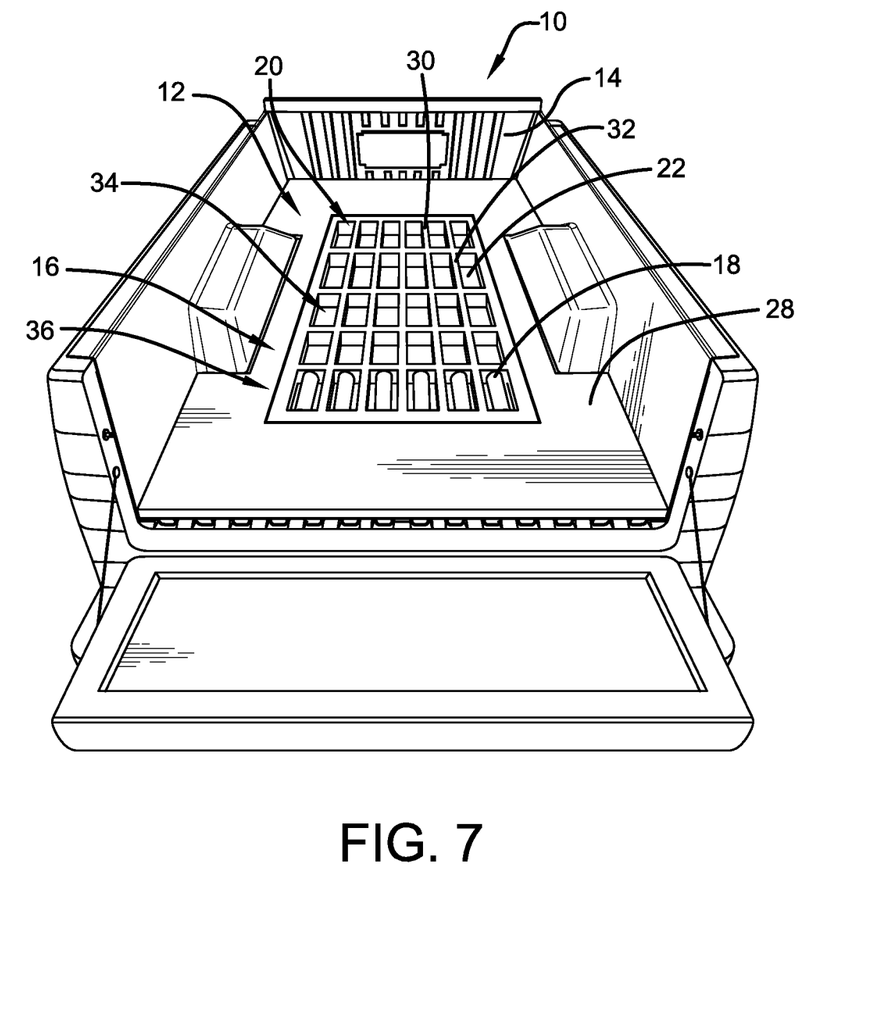
FIG. 7 is a perspective view of a weighted bed liner similar to as shown in FIG. 1, shown with the outer perimeter of the support layer extending to the vehicle bed inner perimeter.
Figure 8:
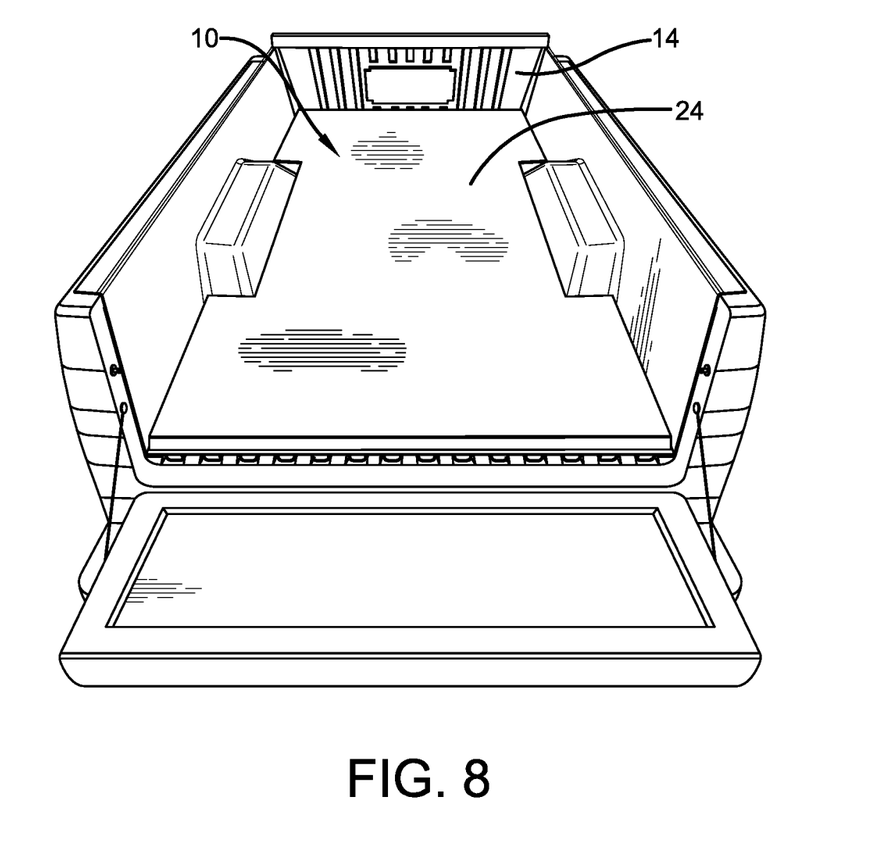
FIG. 8 is a perspective view of the weighted bed liner shown in FIG. 7, shown with the top cover layer.
Figure 9:
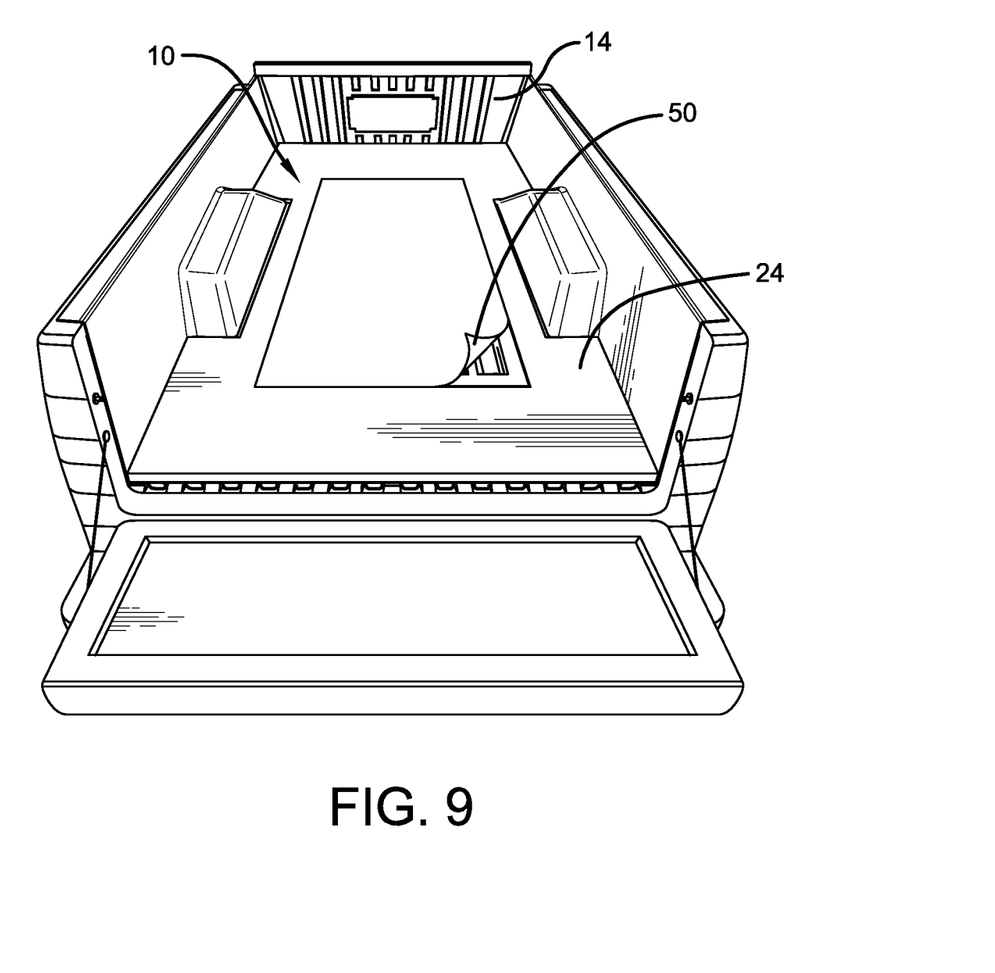
FIG. 9 is a perspective view of the weighted bed liner shown in FIG. 7, shown with the removable section of the top cover layer as a flap.
Figure 10:
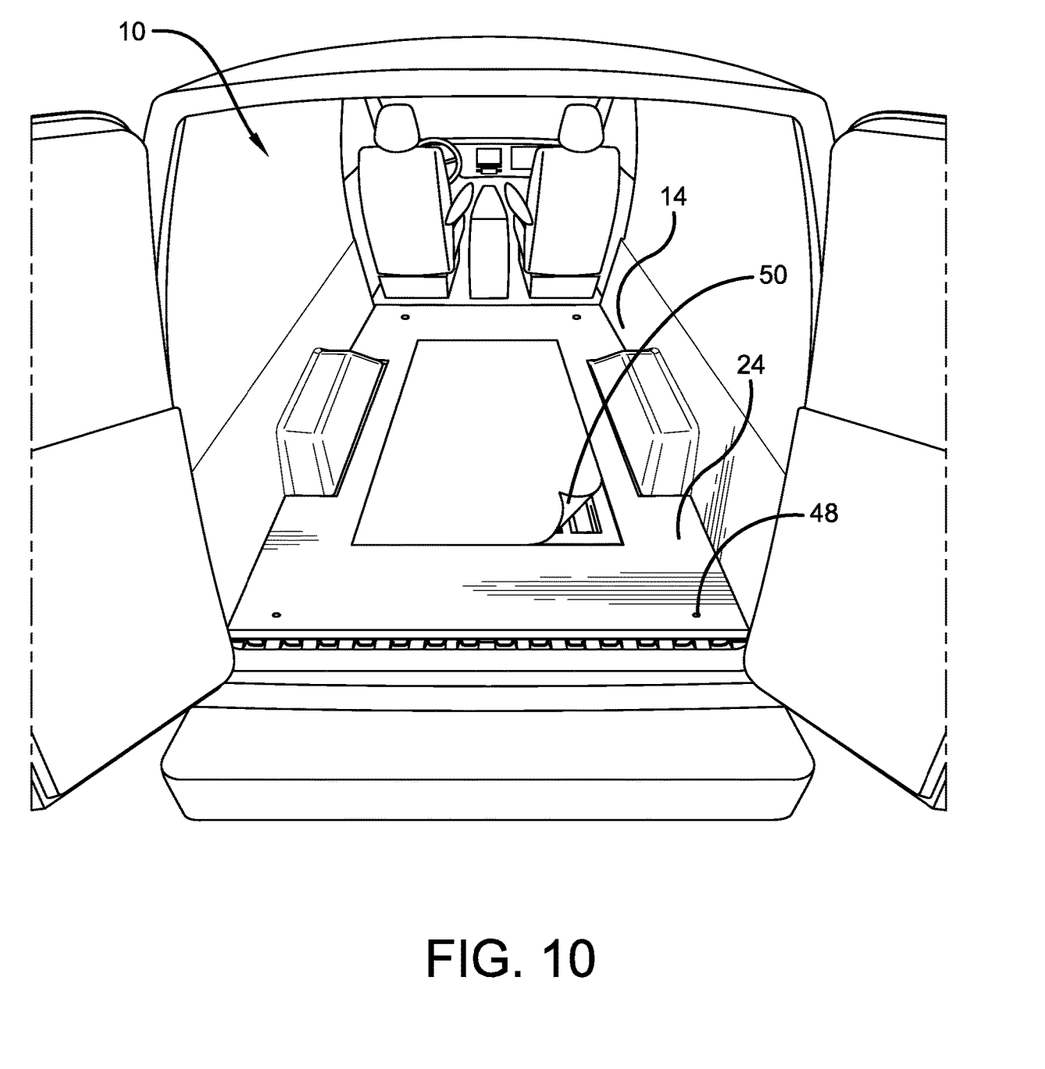
FIG. 10 is a perspective view of the weighted bed liner shown in FIG. 9, shown in a cargo van.

In one or more embodiments, as shown in FIGS. 6, 9, and 10, top layer 24 may include a removable section 50 therein. Removable section 50 is adapted to allow a user to access weight-receiving compartment 16 to add weight thereto. Removable section 50 may be fully removable or partially removable from top layer 24. Removable section 50 may be defined as a lid for securement of weight-providing articles 18 within weight-storing article 20.

Removable section 50 may be of a generally rectangular shape to match the perimeter shape of weight-storing article 20, though other shapes may be suitable. Similar to the above description for top layer 24, removable section 50 should have sufficient strength such that cargo may be stored thereon or a user may stand thereon. Removable section 50 may therefore be made of a rigid material. An exemplary material for removable section 50 is plastic, such as hard plastics. Another exemplary material for removable section 50 is fiberglass. A top surface of removable section 50 may include an additional layer as may be desirable for custom flooring of the associated vehicle. Exemplary materials for such additional layer include polyurethane and wood.

In one or more embodiments, removable section 50 may be secured in place by securement with weight-storing article 20. In these or other embodiments, removable section 50 may be secured in place by securement with the rest of top layer 24.

As shown in FIG. 6, removable section 50 may be secured in place with a plurality of securing members 52 that are positioned through removable section 50 and into weight-storing article 20, which may include being all the way through weight-storing article 20, but not through vehicle bed 14. In one or more embodiments, one securing member 52 may be provided near each outer corner of removable section 50. In these or other embodiments, one securing member 52 may be provided near the center of each end of removable section 50.

Exemplary securing members 52 include Chicago screws. Other exemplary securing members 52 include flat head bolts that are secured with corresponding nuts and that are not secured into vehicle bed 14. Securing members 52 may be made from metal or plastic. Though corresponding channels for securing members 52 are not shown in weight-storing article 20 in FIGS. 1-2, it should be appreciated that corresponding channels in weight-storing article 20 for securing members 52 could be provided in embodiments where securing members 52 are utilized.

In one or more embodiments, removable section 50 is secured by a removable adhesive in addition to or in alternative to securing members 52. The removable adhesive may be provided on two, three, or four ends of removable section 50. Exemplary removable adhesives include touch fasteners, such as hook-and-loop fasteners, and other adhesives, such as removable pressure sensitive adhesives and snap fasteners.

As shown in FIGS. 9 and 10, in one or more embodiments, removable section 50 may be made of a flexible or semi-flexible material. In these embodiments, removable section 50 may be defined as a flap. Removable section 50 as a flap may be secured with weight-storing article 20 in a manner similar to the above description.

In one or more embodiments, as shown in FIG. 6, weighted bed liner 10 may include securing members 48 that are positioned through all layers of weighted bed liner 10, but are not provided through vehicle bed 14. Securing members 48 may be provided in order to provide additional securement of the layers of weighted bed liner 10 with each other. In one or more embodiments, one securing member 48 may be provided near each outer corner of weighted bed liner 10. In these or other embodiments, one securing member 48 may be provided near the center of each end of weighted bed liner 10.

Exemplary securing members 48 include flat head bolts that are secured with corresponding nuts and that are not secured into vehicle bed 14. Securing members 48 may be made from metal or plastic. Though corresponding channels for securing members 48 are not shown in FIGS. 1-4, it should be appreciated that corresponding channels for securing members 48 could be provided in embodiments where securing members 48 are utilized.

It should be appreciated that the weighted bed liner 10 disclosed herein provides one or more advantages, such as improving vehicle traction to thereby prevent accidents and injuries, maintaining a flat surface similar to the flat surface of a vehicle bed to thereby keep the cargo area usable, not requiring a liquid ballast (e.g. water) in some embodiments, and avoiding hazards caused by moveable articles (e.g. sand bags) shifting position when a vehicle is in motion.

In light of the foregoing, it should be appreciated that the present invention advances the art by providing an improved weighted bed liner. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A vehicle bed liner for providing additional weight to a vehicle, the vehicle bed liner comprising
    a support layer including a base material having a thickness, wherein the thickness of the base material is substantially constant across the entirety of the base material,
    a weight-receiving compartment within the support layer, and
    a weight-storing article within the weight-receiving compartment adapted to receive a plurality of weight-providing articles, wherein the plurality of weight-providing articles are capable of being positioned in the weight-storing article to thereby provide additional weight to a vehicle,
    wherein a bottom layer is positioned between the support layer and a vehicle bed to thereby provide protection of the vehicle bed, and
    wherein the support layer is secured with the bottom layer by a plurality of hook-and-loop fasteners or a plurality of snap fasteners.

2. The vehicle bed liner of claim 1, wherein the weight-storing article is a grid including a plurality of first cross members each transversely intersecting with a plurality of second cross members to thereby define a plurality of weight-receiving trays adapted to receive the plurality of weight-providing articles.

3. The vehicle bed liner of claim 2, wherein the weight-receiving compartment is a hollow, rectangular portion of the support layer.

4. The vehicle bed liner of claim 3, wherein the plurality of first cross members are longitudinally extending members, and wherein the plurality of second cross members are laterally extending members.

5. The vehicle bed liner of claim 4, wherein the plurality of weight-providing articles are weight-receiving articles adapted to be filled with a weight-providing material.

6. The vehicle bed liner of claim 4, wherein the plurality of weight-providing articles are unitary weighted articles not requiring further filling with a weight-providing material.

7. The vehicle bed liner of claim 1, wherein the thickness of the base material is from about 1 inch to about 3 inches.

8. The vehicle bed liner of claim 1, wherein a top layer is positioned above the support layer to thereby provide protection of the support layer, the top layer including a removable portion in a position above the weight-receiving compartment.

9. The vehicle bed liner of claim 1, further comprising a top base layer and a bottom base layer surrounding the base material.

10. The vehicle bed liner of claim 1, wherein the weight-receiving compartment is rectangular and has a length of from about 3 feet to about 6 feet and a width of from about 2 feet to about 4 feet.

11. The vehicle bed liner of claim 1, wherein each of the plurality of weight-providing articles weighs from about 5 pounds to about 15 pounds.

12. The vehicle bed liner of claim 1, wherein all of the plurality of weight-providing articles have a combined weight of from about 250 pounds to about 350 pounds.

13. A vehicle bed liner for providing additional weight to a vehicle, the vehicle bed liner comprising
    a support layer including a base material having a thickness, wherein the thickness of the base material is substantially constant across the entirety of the base material,
    a weight-receiving compartment within the support layer, and
    a weight-storing article within the weight-receiving compartment adapted to receive a plurality of weight-providing articles, wherein the plurality of weight-providing articles are capable of being positioned in the weight-storing article to thereby provide additional weight to a vehicle, wherein a bottom layer is positioned between the support layer and a vehicle bed to thereby provide protection of the vehicle bed, wherein a top layer is positioned above the support layer to thereby provide protection of the support layer, the top layer including a removable portion in a position above the weight-receiving compartment, wherein the support layer is secured with the top layer by a plurality of hook-and-loop fasteners or a plurality of snap fasteners.

14. A vehicle bed liner for providing additional weight to a vehicle, the vehicle bed liner comprising a support layer including a base material having a thickness, wherein the thickness of the base material is substantially constant across the entirety of the base material, a weight-receiving compartment within the support layer, a weight-storing article within the weight-receiving compartment adapted to receive a plurality of weight-providing articles, wherein the plurality of weight-providing articles are capable of being positioned in the weight-storing article to thereby provide additional weight to a vehicle, a top base layer and a bottom base layer surrounding the base material, and wherein the base material is polyisocyanurate foam.

15. The vehicle bed liner of claim 14, wherein the top base layer and the bottom base layer are made from a thermoplastic polyurethane.

16. A vehicle bed liner kit for providing additional weight to a vehicle comprising a support layer including a base material having a thickness of from about 1 inch to about 3 inches, wherein the thickness of the base material is substantially constant across the entirety of the base material, a weight-receiving compartment within the support layer, a weight-storing article positionable within the weight-receiving compartment, and a plurality of weight-receiving articles adapted to be filled with a weight-providing material and adapted to be positioned in the weight-storing article to thereby provide additional weight to a vehicle, wherein the weight-receiving compartment is a hollow, rectangular portion of the support layer, wherein the weight-storing article is a grid including a plurality of longitudinally extending members each transversely intersecting with a plurality of laterally extending members to thereby define a plurality of weight-receiving trays adapted to receive the plurality of weight-providing articles, further comprising a bottom layer made of rubberized fabric and a top layer made of plastic, wherein the bottom layer and the top layer are adhesively securable with the support layer, the support layer further comprising a top base layer and a bottom base layer surrounding the base material, wherein the base layer is made of polyisocyanurate foam, the top layer further comprising a removable portion in a position above the weight-receiving compartment.

* * * * *